United States Patent
Kahra

(10) Patent No.: US 10,189,298 B2
(45) Date of Patent: Jan. 29, 2019

(54) DEVICE FOR HOLDING AND TILTING A CONTAINER

(71) Applicant: Robert Kahra, Big Bear Lake, CA (US)

(72) Inventor: Robert Kahra, Big Bear Lake, CA (US)

( * ) Notice: Subject to any disclaimer, the term of this patent is extended or adjusted under 35 U.S.C. 154(b) by 0 days.

(21) Appl. No.: 15/854,629

(22) Filed: Dec. 26, 2017

(65) Prior Publication Data

US 2018/0194162 A1     Jul. 12, 2018

Related U.S. Application Data

(60) Provisional application No. 62/444,290, filed on Jan. 9, 2017.

(51) Int. Cl.
| | |
|---|---|
| *B44D 3/14* | (2006.01) |
| *B65G 65/23* | (2006.01) |
| *B05B 9/00* | (2006.01) |
| *B05B 15/00* | (2018.01) |

(52) U.S. Cl.
CPC .............. *B44D 3/14* (2013.01); *B05B 9/00* (2013.01); *B65G 65/23* (2013.01); *B05B 15/00* (2013.01)

(58) Field of Classification Search
CPC .......... B44D 3/14; B65G 65/23; A47G 29/00
See application file for complete search history.

(56) References Cited

U.S. PATENT DOCUMENTS

| | | | |
|---|---|---|---|
| 5,217,193 A | 6/1993 | Drucker | |
| 5,772,163 A * | 6/1998 | Young | A45D 40/265 248/139 |
| 5,934,627 A * | 8/1999 | Lewis | E04D 15/00 248/148 |
| 6,533,227 B1 * | 3/2003 | Rom | B44D 3/14 248/148 |
| 6,742,747 B1 * | 6/2004 | Timmons, Jr. | A01B 59/06 248/139 |
| 7,651,060 B2 | 1/2010 | Roth et al. | |
| 7,887,016 B2 * | 2/2011 | Gunsaullus | E06C 7/14 108/152 |
| 10,011,475 B1 * | 7/2018 | Brekke | B65G 65/23 |

* cited by examiner

*Primary Examiner* — Ryan A Reis
(74) *Attorney, Agent, or Firm* — Christopher Mayle; John Houvener; Bold IP PLLC

(57) ABSTRACT

An apparatus and method for holding a container on the apparatus, whereby the container is adapted to include various liquids, including paint, and to automatically tilt when the liquids in the container are reduced to a predetermined weight. The apparatus includes a top plate, a hinge assembly, and a bottom plate, whereby the top plate is hingedly coupled to the bottom plate by the hinge assembly. A leg extends outwardly away from the bottom plate, whereby the leg is coplanar with the bottom plate. A hook connected to a top end of a bungee cord extends from a top surface of the top plate, and retaining wall protrudes upwardly from the top plate, whereby the retaining wall extends around at least a portion of a perimeter of the top plate. The container is positioned on the top plate and at least partially enclosed by the retaining wall.

20 Claims, 12 Drawing Sheets

```
┌─────────────────────────────────────────────────────────┐
│           Provide container holding device (1202)        │
└─────────────────────────────────────────────────────────┘

┌─────────────────────────────────────────────────────────┐
│      Place container holding device on intended surface (1204)      │
└─────────────────────────────────────────────────────────┘

┌─────────────────────────────────────────────────────────┐
│                    Provide container (1206)              │
└─────────────────────────────────────────────────────────┘

┌─────────────────────────────────────────────────────────┐
│          Place container on top surface of top plate (1208)          │
└─────────────────────────────────────────────────────────┘

┌─────────────────────────────────────────────────────────┐
│ If container is heavier than pre-determined weight, top plate of container hold- │
│            ing device is flat against the bottom plate (1210)             │
└─────────────────────────────────────────────────────────┘

┌─────────────────────────────────────────────────────────┐
│       Orient container including location hook over handle of container (1212)       │
└─────────────────────────────────────────────────────────┘

┌─────────────────────────────────────────────────────────┐
│             Reduce amount of material in container (1214)             │
└─────────────────────────────────────────────────────────┘

┌─────────────────────────────────────────────────────────┐
│       Top plate of container holding device rotates upwardly away        │
│                    from bottom plate (1216)                  │
└─────────────────────────────────────────────────────────┘

┌─────────────────────────────────────────────────────────┐
│     Material in container is displaced to one side of container and      │
│                 container is tilted on device (1218)                │
└─────────────────────────────────────────────────────────┘
```

FIG. 12

DEVICE FOR HOLDING AND TILTING A CONTAINER

CROSS-REFERENCE TO RELATED APPLICATIONS

The present application is a non-provisional patent application which claims the benefit of priority to U.S. provisional patent application Ser. No. 62/444,290, which was filed on Jan. 9, 2017, and which is incorporated herein fully in its entirety.

BACKGROUND

In many building trades, contractors and workmen use paint spraying to more efficiently paint a room or wall as opposed to solely using a paint brush or roller. Paint spraying usually involves using devices such as motorized paint sprayers (e.g. TITAN 440 Airless Paint Sprayer) that work by pumping paint at a very high pressure (e.g. approximately 3000 psi or more or less than this number), through one or more hoses to an attached spray paint gun, whereby the pumped paint is sprayed from the nozzle of the attached spray paint gun onto the intended surface. Paint sprayers can speed up a project or job that requires several gallons of paint, and can often be applied twice as fast as using a paint brush or roller. Further, paint sprayers are particularly desirable for being able to apply a smooth finish of paint from the attached spray paint gun.

Paint sprayers usually are placed on a surface near a painter and plugged into a nearby outlet or other power source. The intake tubes from the paint sprayers are placed inside a paint pail or bucket that usually holds several gallons (e.g. 1-5 gallons) of paint, and the intake tubes from the paint sprayer pump the paint from the paint pail or bucket to the attached spray paint gun. This allows the painter to paint a larger area without the need to refill the bucket as often as if the painter only had access to a small amount of paint. Paint sprayers and the attached spray paint guns are frequently used with larger projects that involve painting over large areas, including but not limited to, the exterior or interior of houses, commercial buildings, garages, roofs, or any other location.

A number of issues exist for many professional painters and contractors that use paint sprayer machines and buckets or paint pails while painting. First, as the amount of material or paint in the bucket decreases to approximately half a gallon (without limitation), it becomes difficult for the paint sprayer to pump the paint into the paint gun. In order to remedy this problem, it is quite common to see professional painters and contractors use various nearby items to prop up the paint bucket so that the material that is left in the bucket tilts to the side of the bucket and the painters may position the intake tubes of the paint sprayer on that side where the material is located. Examples of common items that professional painters and contractors use to prop their paint buckets to one side include bricks, rolls of tape or duct tape, books, and even pine cones. These common place items are used to keep the paint bucket up on its side so that the painter can use that last bit of paint left in the bucket without having to waste it or refill the bucket as often. However, these items are in no way naturally configured to provide adequate support for a paint bucket or other type of container, and it is frequently a problem that the buckets when propped on such devices eventually tips over causing a mess and wasted material as well as potential damage to a connected paint sprayer.

Another issue with paint sprayers and the buckets used to supply paint to the paint sprayers is that once a specific amount of paint is removed from the bucket and the intake tubes from the paint sprayer are still located in the bucket, the bucket tends to tip over due to the decreased overall weight of the bucket versus the weight of the intake tubes. This can result in spilled or wasted paint, wasted time, and potentially damage to the paint sprayer machine if the machine begins to intake air instead of paint. Professional painters and contractors complain about how frequently they have to stop their work to refill their paint buckets and to readjust the position of their paint sprayers.

Also, there is no warning or alert system provided to the painter or other contractor that the amount of material in the bucket has decreased so significantly that the bucket needs to be tilted to one side, unless a fellow painter or co-worker is monitoring the bucket and alerts the painter. Thus, there is still a need for a device that automatically adjusts itself as paint or other material is removed from the bucket to allow for the longest time of continuous use and to alert the painter that they need to refill the bucket.

SUMMARY

In one aspect, embodiments in the present description are provided that relate to an apparatus for holding and tilting a container. The apparatus may also be referred to as a container holding device. In one or more embodiments, a container holding device as described herein may include a top plate, the top plate having a proximate end and a distal end. Further, the container holding device may include a hinge assembly. The proximate end of the top plate may be located proximate to the hinge assembly and the distal end of the top plate may be located at an opposite end from the proximate end.

Further, the container holding device may include a bottom plate, wherein the top plate is hingedly coupled to the bottom plate by the hinge assembly, the bottom plate having a proximate end and a distal end, wherein the proximate end of the bottom plate is located proximate to the hinge assembly and the distal end of the bottom plate is located on an opposite end from the proximate end. A container holding device may also include a leg that is configured to extend outwardly away from the bottom plate. The leg may be coplanar with the bottom plate, and the leg may be connected to the bottom plate near the distal end of the bottom plate. Further, the container holding device may include a hook connected to a top end of a bungee cord, such that the bungee cord is adapted to extend upwardly from the top surface of the top plate.

The top plate of the container holding apparatus may also include a retaining wall, whereby the retaining wall protrudes upwardly from a top surface of the top plate. The retaining wall may extend around at least a portion of a perimeter of the top plate or in some configurations may extend all the way around the top plate. Notably, the top plate is rotatable relative to the bottom plate, and the container holding device is capable of holding a container, such as a bucket or pail. Further, a container may be placed on the top surface of the top plate and may be at least partially enclosed by the retaining wall.

In another aspect, an exemplary method of accessing material in a container using a container holding device. According to one exemplary method, a device is provided that may include, in one or more non-limiting embodiments, a top plate, a hinge assembly, and a bottom plate, whereby the bottom plate is hingedly coupled to the top plate by the hinge assembly. Further, the bottom plate may have a leg that extends outwardly from the bottom plate, such that the bottom plate is coplanar with the leg and the leg is connected to the bottom plate at a distal end of the bottom plate. Further, the device may include a hook connected to a bungee cord, whereby the hook and bungee cord extend upwardly from a top surface of the top plate. In one or more embodiments, the hinge assembly may include at least one torsion spring coupled to the bottom plate and the top plate as part of the hinge assembly.

The exemplary method may include placing the device on an intended service. Further, a container may be provided. In one or more embodiments, the container may include a handle, whereby the handle is rotatable in an upwards and downwards direction. The container may be placed on top of the top surface of the top plate, whereby a weight of the container causes the top plate to be flat and substantially parallel with the bottom plate. Once the container is placed on the top plate, the container may be oriented such that the handle is next to a position of the hook and bungee cord, and the handle is oriented in a downward facing position. Responsive to placing the container on the top surface of the top plate, the hook may be hooked over the handle.

Subsequently, the amount of material in the container may begin to be reduced. For example, a connected paint sprayer may be activated and may begin to draw in material from the container into one or more intake tubes on the attached sprayer. In one or more embodiments, the reduction in the amount of material in the container may cause the top plate to automatically rotate upwardly up to a maximum angle away from the bottom plate. Responsive to rotating the top plate upwardly at an angle away from the bottom plate, the material may be displaced in the container to one side of an interior of the container as a result, whereby the container is tilted and oriented in the same position as the top plate of the container holding device.

Other aspects and advantages of this disclosure will become apparent from the following detailed description.

BRIEF DESCRIPTION OF THE DRAWINGS

FIG. 12 is a flowchart of an exemplary process for using a container holding device in accordance with one or more illustrative embodiments.

DETAILED DESCRIPTION

Figure 1:
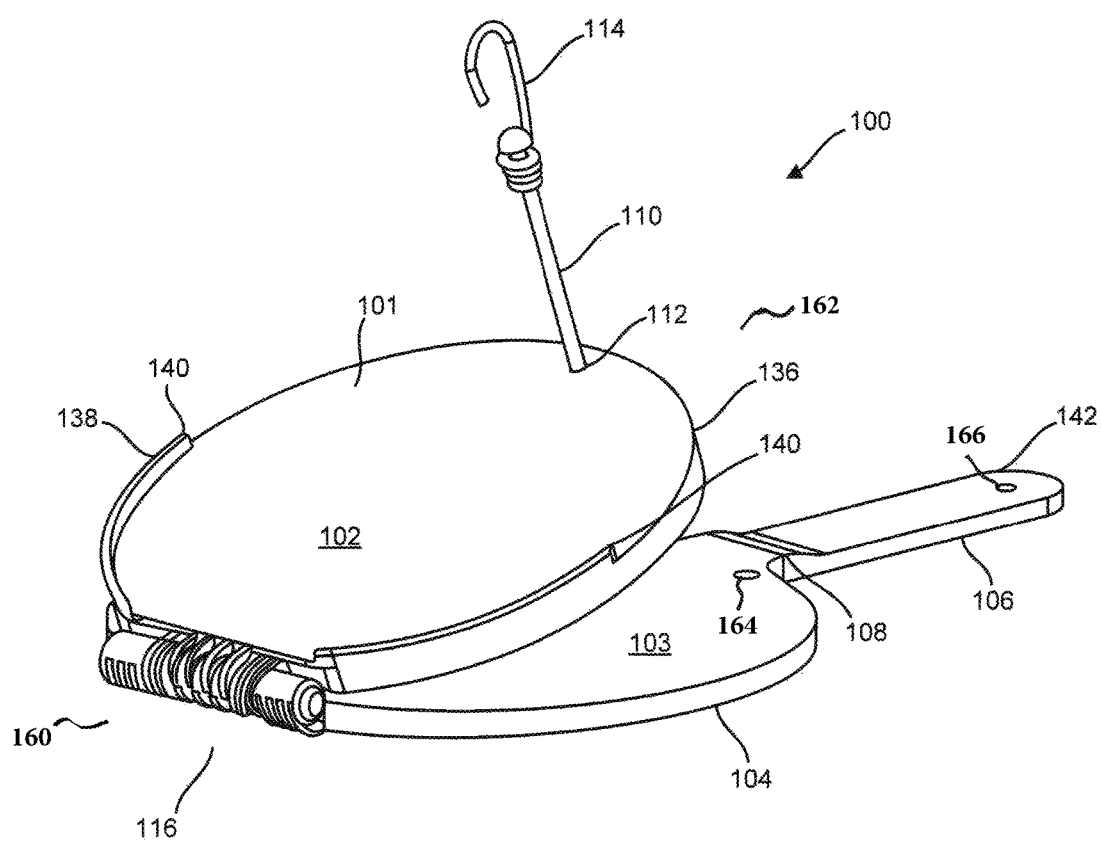
FIG. 1 is a perspective view of a container holding device in accordance with one or more illustrative embodiments.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. It is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, the preferred methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited.

It must be noted that as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

References in the singular tense include the plural, and vice versa, unless otherwise noted. Further, as used herein, the term "coupled" or "coupling" may indicate a connection. The connection may be a direct or an indirection connection between one or more items. Further, the term "set" as used herein may denote one or more of any item.

Throughout the drawings, like reference characters are used to designate like elements. Further, the drawings are not to scale and depicted components or structures may have dimensions other than those depicted or perceived in the drawings.

Embodiments in the present description are drawn to a device (or apparatus) adapted to holding a container, such as a bucket or a pail, whereby the container is configured to tilt automatically. There are many useful applications for the one or more embodiments described in the current description, including but not limited to, the painting industry. As noted above, many painting projects involve the use of paint sprayers (including airless and non-airless paint sprayers). Paint sprayers paint sprayers are motorized devices that spray paint under pressure. It is noted that any type of paint sprayer, whether airless or using air (e.g. such as those having an air compressor) may still be used with one or more embodiments of a container holding device used herein. Typically, paint sprayers have several advantages over traditional painting using a roller or brush, because paint sprayers allow a painter to complete a project in a much shorter period of time, with a smaller labor force, and allow a painter to apply several different types of coatings as well as a smooth, even finish.

However, an ongoing problem that persists for painters and contractors in this industry is that once the amount of weight is reduced to a particular amount (e.g. about 0.5 gallons without limitation thereto), the paint sprayers have difficulty intaking the material that remains in a paint bucket or paint pail. This poses a serious problem for the painter, because when an airless paint sprayer intakes a mixture of air and paint, there is the possibility of damage occurring to the paint sprayer, and the paint sprayer does not function properly.

In response to this ongoing problem, painters and contractors typically try to prop up a paint bucket or pail using any object that is conveniently available, such as, a pine cone, a rock, a brick, a roll of duct tape, or any other item that can be placed under a bucket and used to prop up the bucket to one side. These are items that are frequently found in job sites and located around painters and contractors, and are examples of items that these individuals have used for many years to prop up or tilt a paint bucket or pail on its side. These individuals try to tilt the paint bucket or pail so that the remaining amount of material or paint left in the paint bucket is displaced and shifted to one side in a larger quantity, thus making it easier for an intake tube attached to a paint sprayer to intake the remaining amount of paint and to pump this remaining amount of paint to the nozzle of an attached spray paint gun.

Notably, paint sprayers are used for all kinds of interior and exterior projects, and it is not necessarily a simple task to monitor when the paint bucket or other container needs to be tilted to one side, because the painter may be working on top of roofs or near a ceiling on a ladder and it may not be convenient to continuously monitor the paint bucket. Further, it is possible that the paint sprayer may be several feet (e.g. 50 feet) away from the location that a painter is actually painting and usually the painter does not realize that the paint has been reduced to a minimal amount until the spray gun does not function properly.

Additionally, another major problem with using objects such as a pine cone, a rock, a brick, a roll of duct tape is that the bucket is not stabilized, or sturdy as located on top of these items, especially with the additional weight and bulk of the intake tubes from the paint sprayers being located within the bucket. It is very common for buckets to tip over when they are propped on such objects, which causes all the remaining contents of the bucket to spill out, leaving a mess and wasted expense associated with the spilled contents. Accordingly, there is a recognizable need for a device that can improve upon the current options for tilting a paint bucket to its side.

Accordingly, the one or more embodiments for a device described in the present description relate to a device that is self-adjusting by using one or more torsion springs that may return to an original, expanded position, thus displacing the contents of the bucket to one side of the bucket and automatically tilting a bucket located on a holding device according to embodiments described in the present description. This allows the painter or contractor to have the longest continuous time to paint using the remaining amount of material in the bucket. Further, the device is designed to include, in one or more embodiments, a hinge assembly that expands when the bucket is at a lower weight causing the bucket to be tilted to one side, but is also retained in place by a retaining wall so that the bucket does not tip over or spill, unlike what happens with conventional methods that utilize pine cones, bricks, or rocks to prop up a bucket. Further details are provided below with respect to the Figures.

Figure 2:
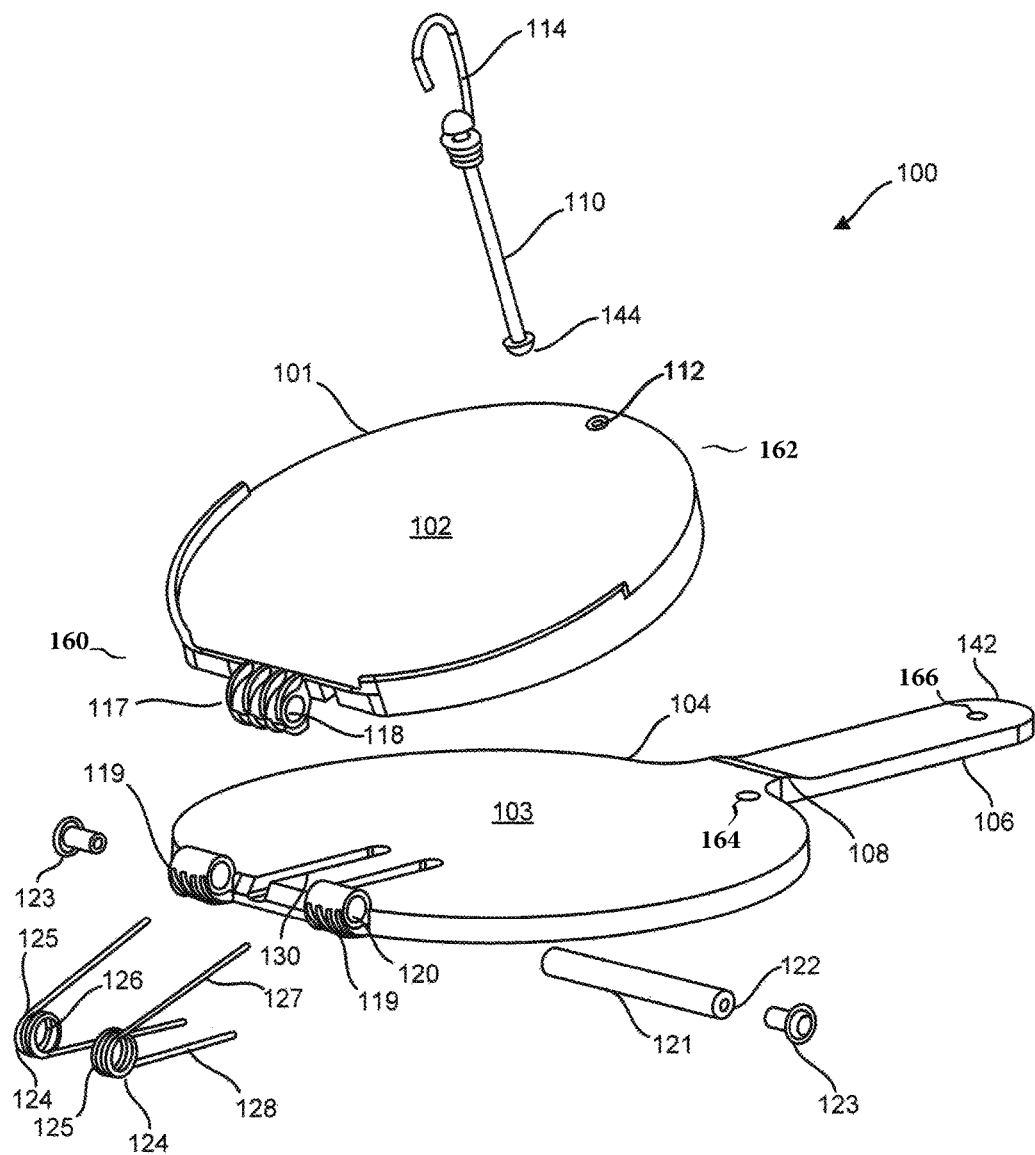
FIG. 2 is an exploded view of a container holding device in accordance with one or more illustrative embodiments.
Figure 4:
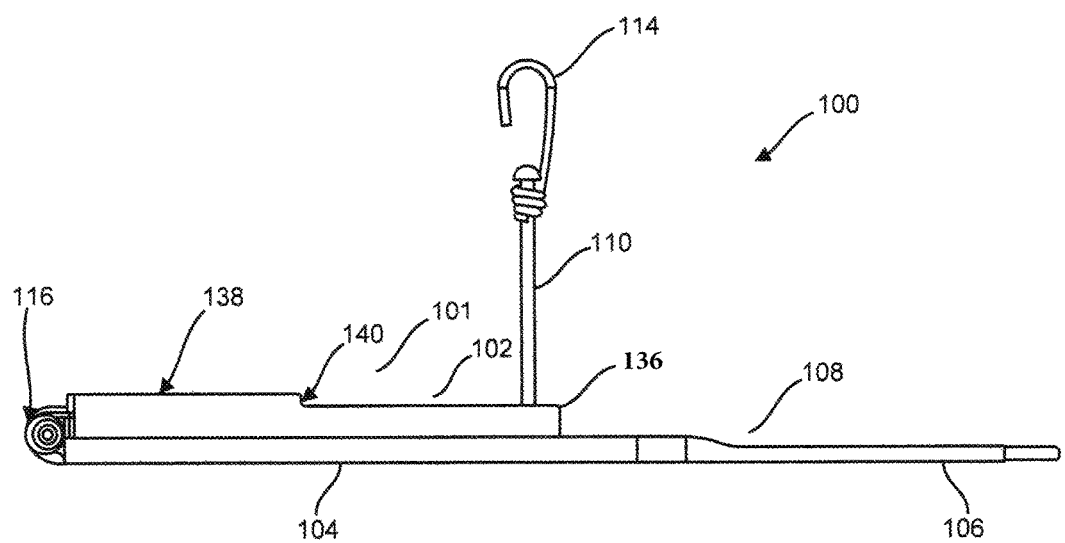
FIG. 4 is a side view of a container holding device in a compressed position in accordance with one or more illustrative embodiments.
Figure 7:
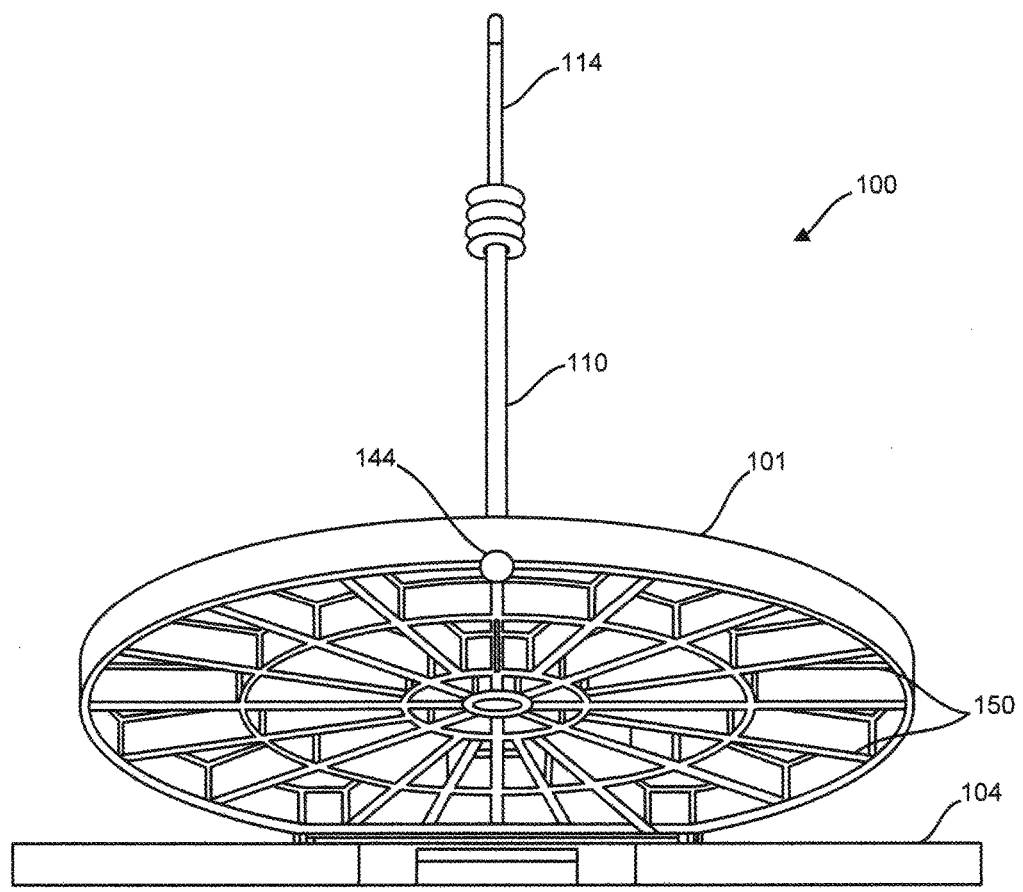
FIG. 7 is an interior view of the container holding device in accordance with one or more illustrative embodiments.
Figure 8:
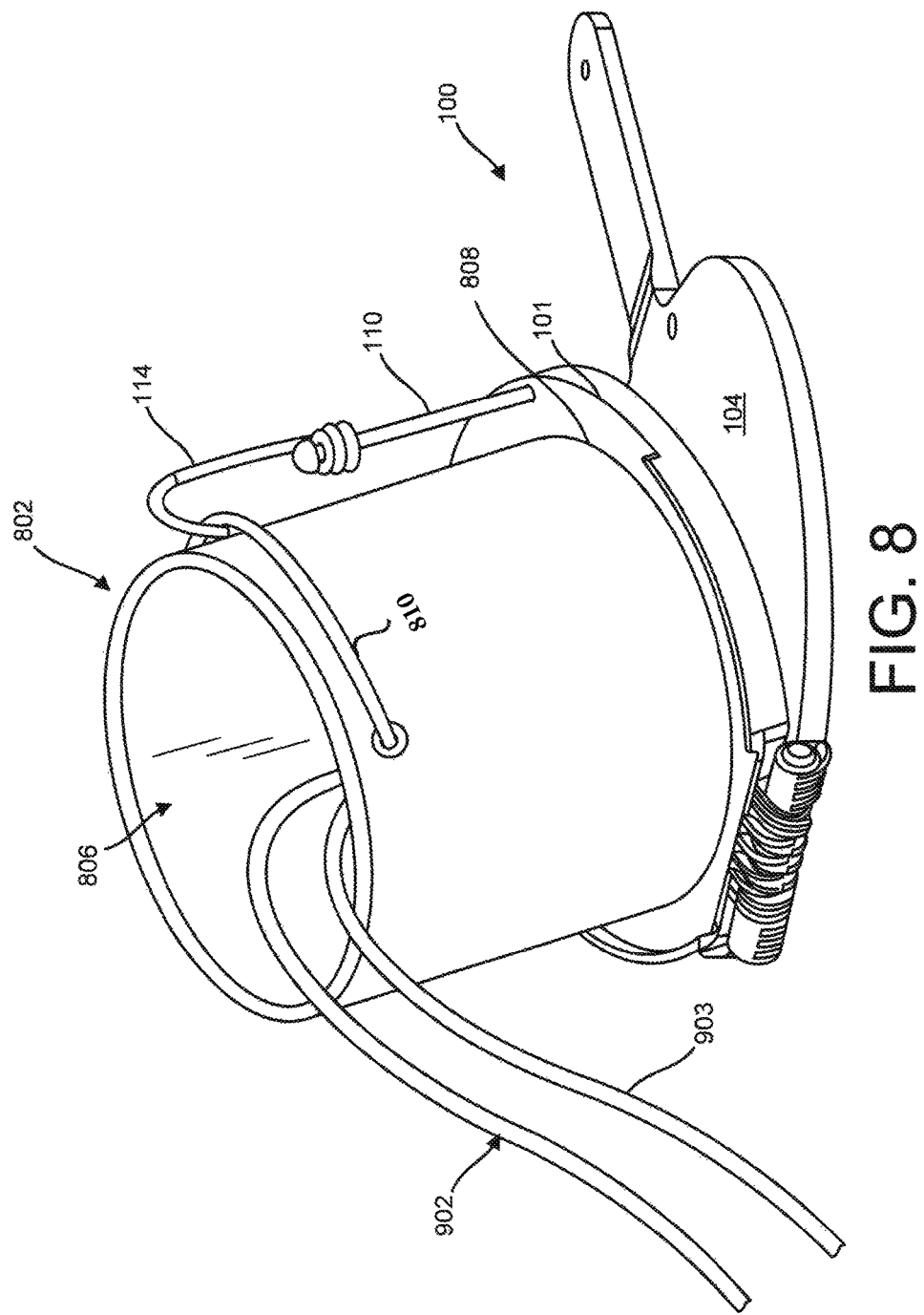
FIG. 8 is a pictorial illustration of a container located on a container holding device in an expanded position in accordance with one or more illustrative embodiments.
Figure 9:
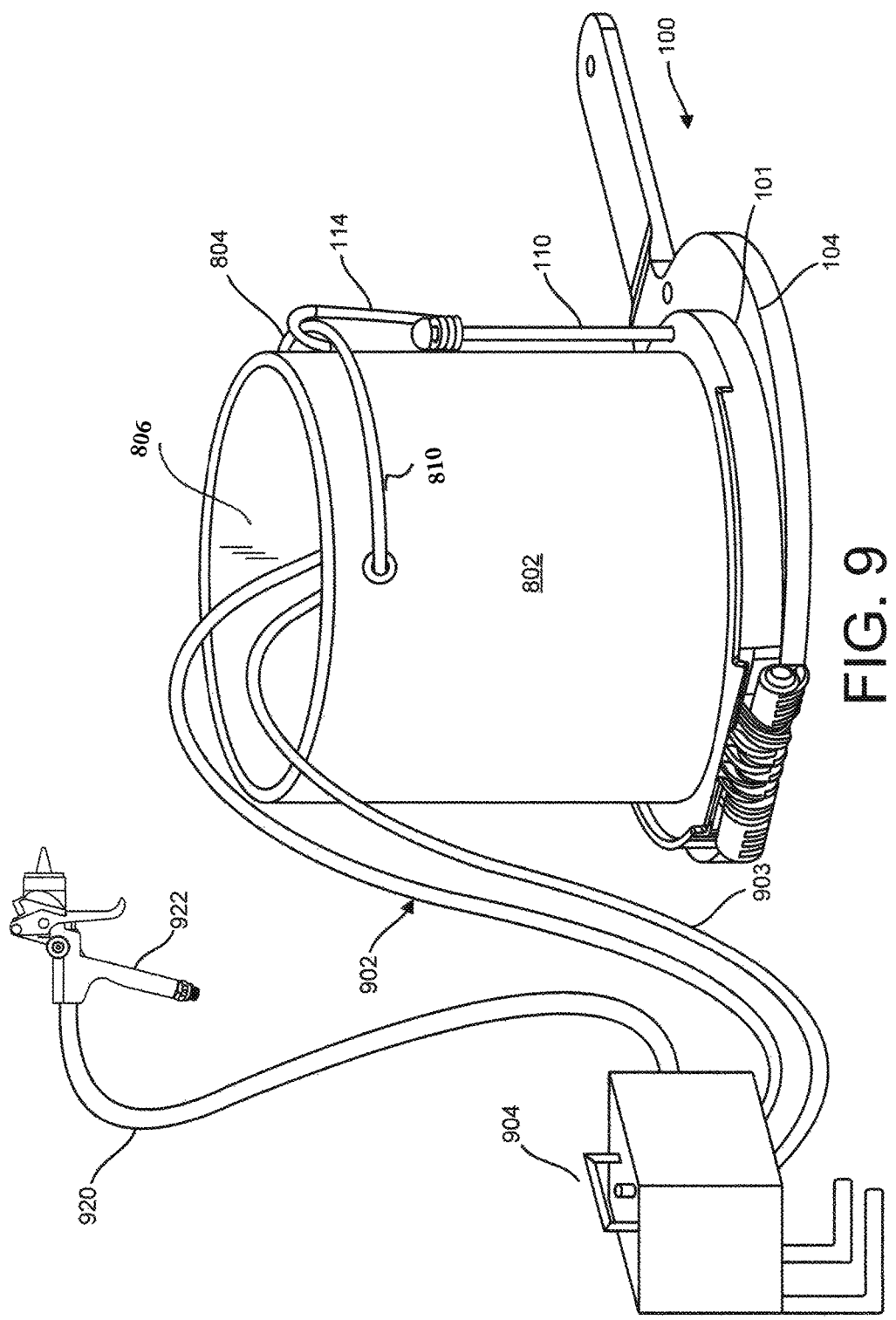
FIG. 9 is a pictorial illustration of a system for operating a container on a container holding device with the container holding device in a compressed position in accordance with one or more illustrative embodiments.

Turning to FIG. 1 and FIG. 2, FIG. 1 is a perspective view of container holding device 100 (also referred to herein as a "holding device"). FIG. 2 is an expanded view of various components of the same container holding device 100 shown in FIG. 1 and elsewhere. In one or more embodiments, container holding device 100 is particularly adapted for its ability to self-adjust from a compressed, flat position (e.g. as shown in FIG. 4, FIG. 6m and FIG. 9) to an expanded, tilted position (e.g. as shown in FIGS. 1-2, FIG. 5, FIG. 7, and FIG. 8).

In one or more embodiments, container holding device 100 may include, but is not limited to, top plate 101, base plate 104, leg 106, hinge assembly 116, retaining wall 138, bungee cord 110 and hook 114. Top plate 101 may be hingedly coupled (i.e. connected either directly or indirectly via any type of hinge) to bottom plate 104 to provide a lever type device.

Top plate 101 has top surface 102, while bottom plate 104 has top surface 103. In this embodiment shown in FIG. 1, top plate 101 has a generally circular design that is sized to fit various containers, including, but not limited to, buckets, pails, tins, or cans. In alternative embodiments, any other shape may be used for top plate 101 (or bottom plate 104), such as without limitation, square, oval, circular, or a combination therefor. Most containers used by painters or contractors may include an open end and a closed end, and one or more handles.

These containers are designed to hold liquids (which may also be interchangeably referred to herein as "material") and other type of objects. Such liquids may include, but are not limited to, any type of paint known in the industry. Accordingly, any type or kind of paint or paint material may be used, without limitation, in a container suitable for use with container holding device 100. Examples of paint that may be used to fill a container suitable for placing on top of top plate 101 of holding device 100 include, without limitation, latex, acrylics, oil-based, water-based, lacquers and coatings, primers, block fillers, or any other type of material used to paint onto a surface. Further, the paint may be suited for interior or exterior surfaces. It is an object of the present description that holding device 100 may be particularly well-suited to containers, such as buckets or pails that hold anywhere from at least 1 gallon to 5 gallons of material, although other volumes or sized containers may also be accommodated as well.

Figure 10:
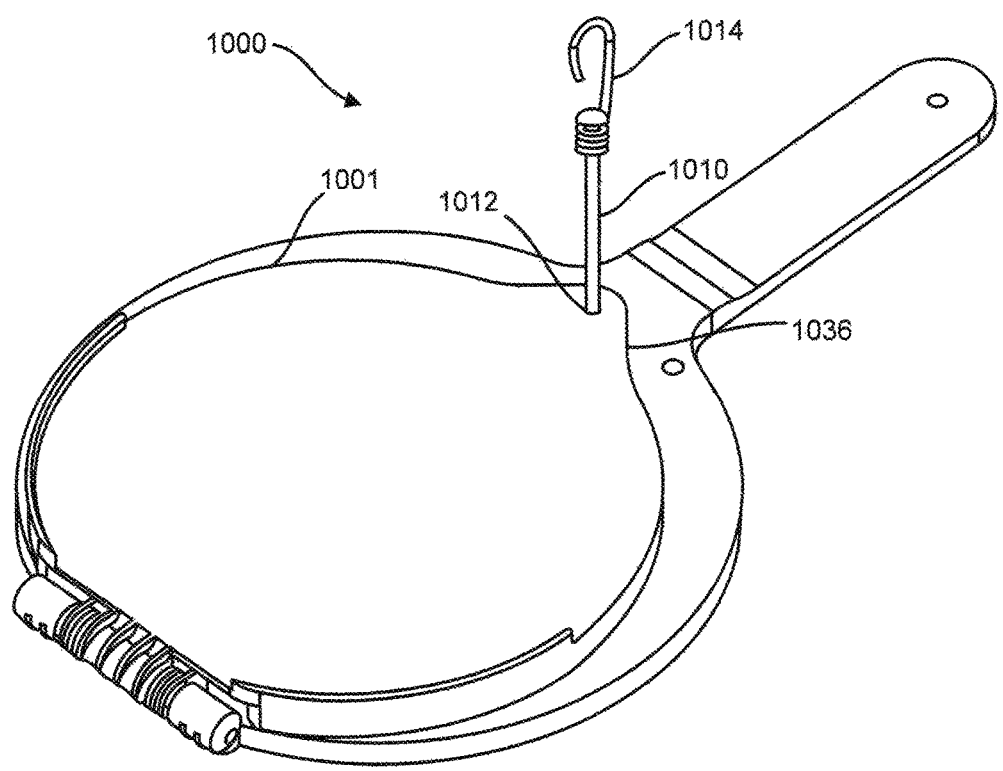
FIG. 10 is a perspective view of another container holding device in accordance with one or more illustrative embodiments.

It is noted that while top plate 101 may have a generally circular design to accommodate circular designed containers, which is because most standard buckets, tins, cans, and pails are generally circular shaped. However, in FIG. 10, the holding device includes a generally circular design and a curved portion formed in the top plate, (i.e. curved protruding portion 1036) that may allow more room for a bucket or other container to be located on a top surface (e.g. top surface 102 of top plate 101), while the hook and bungee cord protrude from the curved edge (e.g. 1036). More details about this useful design as shown in FIG. 10 is provided later below in the present description.

As shown in FIG. 1, in one non-limiting embodiment, bungee cord 110 protrudes from hole 112, whereby hole 112 passes through from the top surface 102 of top plate 101 to an underside of top plate 101. Further, hook 114 is affixed or attached to an upper end of bungee cord 110. Hook 114 may be any suitable size or shape and may be made of any desired material, including, but not limited to stainless steel. Further, bungee cord 110 may be made of any suitable material known in the art without limitation thereto. It is preferable that bungee cord 110 may be elastic and have the ability to stretch over some distance and yet still be sturdy.

In one or more non-limiting embodiments, hook 114 and bungee cord 110 may be secured to top plate 101 by tying a knot near a lower end of bungee cord 110, such as knot 144 that prevents bungee cord 110 from slipping through hole 112. Knot 144 is shown in clearer detail in FIG. 2, and also shown in FIG. 7 in operation. In FIG. 7, knot 144 is shown located on an underside of hole 112, while bungee cord 110 and hook 114 extend upwardly from a top surface 102 of top plate 101. Those of ordinary skill in the art will appreciate that any other means of fastening or attaching bungee cord 110 to top plate 101 may be used, including using adhesives, welding or soldering, fasteners, or any other preferred means of attachment other than using knot 144. With respect to hook 114, hook 114 may also be knotted around and joined to a top end of bungee cord 110, in one embodiment, although any other means of attachment may also be used.

As shown in FIGS. 1 and 2, retaining wall 138 protrudes upwardly from top plate 101. Retaining wall 138 provides a stabilizing, secure protruding part of top plate 101 for supporting a container that is placed on top of top plate 101 (e.g. as shown in FIGS. 8 and 9) in place without the possibility that such a container may tip or fall over or slide off of top plate 101. In effect, retaining wall 138 acts as a barrier that is useful to keep a container located on top plate 101 from slipping or falling off a top surface 102 of top plate 101.

Figure 3:
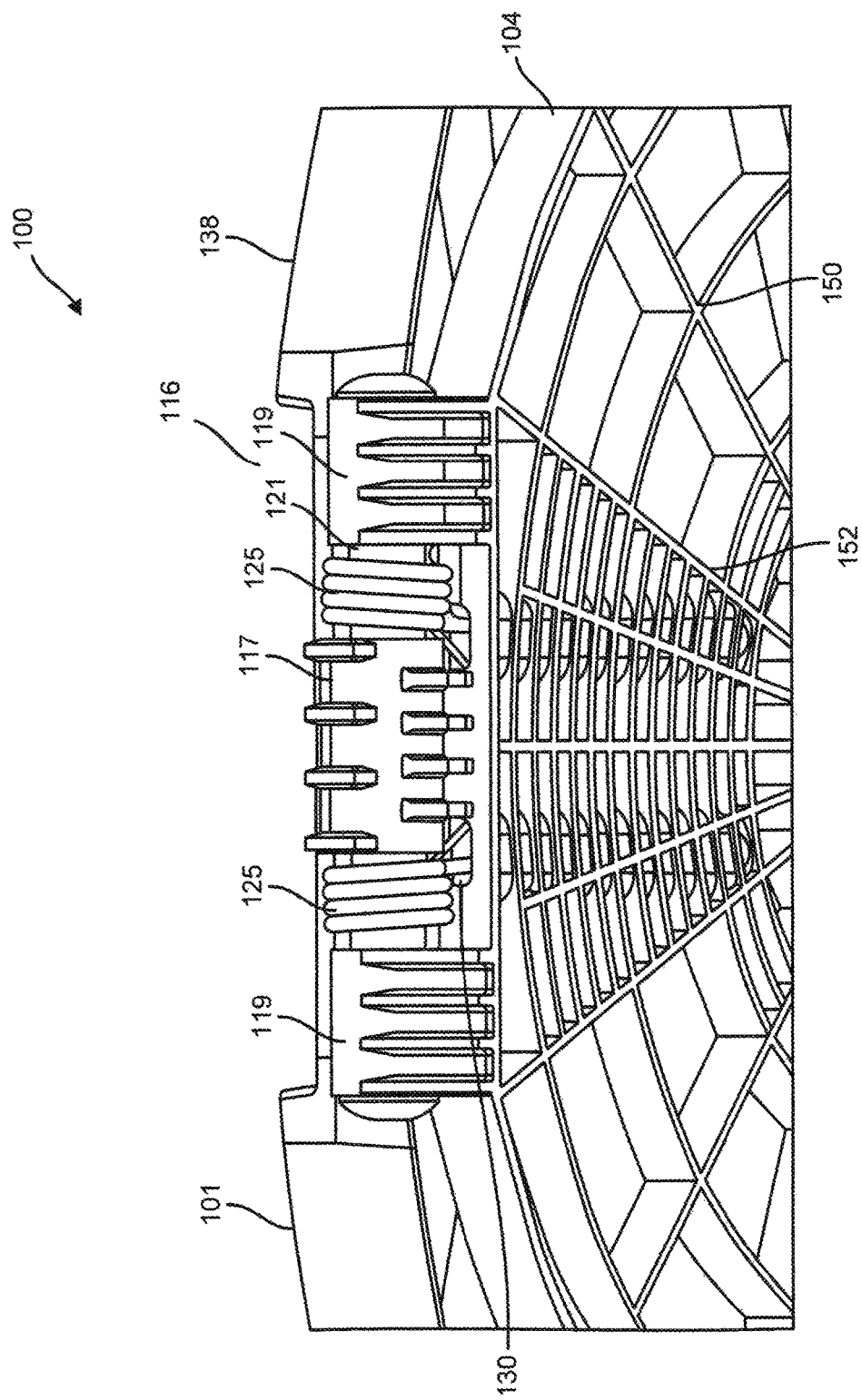
FIG. 3 is a detailed view of a hinge assembly on a container holding device in accordance with one or more illustrative embodiments.

Retaining wall 138, as shown throughout the Figures, extends partially around a perimeter or circumference of top plate 101, and terminates on either side at terminal ends 140. FIG. 3 further shows in greater detail that, in one non-limiting embodiment, retaining wall 138 may only extend partially on either side of top plate 101 so as not to extend fully around the proximate edge of top plate 101 near hinge assembly 116.

In alternative embodiments, it may be desirable for retaining wall 138 to be continuously extend around all or substantially all the way around the entire perimeter or circumference of top plate 101. While retaining wall 138 is shown extending approximately halfway or less around the perimeter or circumference of top plate 101, those of ordinary skill will appreciate that alternative configurations may be used. When placing a container on top plate 101, it is possible that one side of a container abuts and/or makes contact with an interior facing side of retaining wall 138, such that the container is supported by retaining wall 138. However, it is also possible that the container located on top surface 102 of top plate 101 does not necessarily touch retaining wall 138 (e.g. as shown in FIGS. 8 and 9), but rather is supported in case the container begins to slide backwards or off to the side.

Edge 136 of top plate 101 is located opposite to retaining wall 138, and is located proximate to bungee cord 110 and hole 112. A hinge assembly, shown as hinge assembly 116 in FIG. 1, and in more detail in FIG. 2 is also included in the present description. For purposes of the present description, proximate end or edge 160 (as shown in FIGS. 1 and 2) refers to a proximate end or edge of either top plate 101 or bottom plate 104. Likewise, distal end or edge 162 (as shown in FIGS. 1 and 2) may refer to a distal end of either of top plate 101 or bottom plate 104. Proximate edge or end 160 may be located closest to hinge assembly 116, while the distal edge or end may be located farthest from hinge assembly 116 and therefore opposite from hinge assembly 116. As shown in FIGS. 1 and 2, hook 114 and bungee cord 110 are located near distal end 162 of top plate 101.

Bottom plate 104 acts as a base plate that also provides stability and support for container holding device 100. Bottom plate 104 includes top surface 103. Further, in one or more embodiments, bottom plate 104 includes two channels, shown as channels 130. Channels 130 are formed into a body of bottom plate 104. Channels 130 may be substantially parallel and located generally adjacent to one another. Channels 130, as shown in FIGS. 1 and 2, do not extend all the way through bottom plate 104, but rather terminate near the proximate end 160 of bottom plate 104. Further, channels 130 extend longitudinally along a longitudinal axis of bottom plate 104. Channels 130 are intended to receive bottom leg protruding members 128 of torsion springs 124 such that channels 130 are able to hold bottom leg members 128 in place within the grooved portions of channels 130. More details regarding hinge assembly 116, torsion springs 124, and their respective components are provided further below.

In addition to the above, a leg, such as leg 106 is connected to bottom plate 104. In one or more embodiments, leg 106 may be integrally formed with a remainder of bottom plate 104, although in alternative configurations, leg 106 may be separately formed and attached. At the connection point between leg 106 and bottom plate 104, is tapered leg portion 108 which is an area of leg 106 that tapers and joins with bottom plate 104 at a distal end of bottom plate 104.

Leg 106 serves to provide additional support and stability for container holding device 100. In one or more non-limiting embodiments, bottom plate 104 and leg 106 are coplanar and aligned along a same axis. Further, bottom plate 104 and leg 106 generally have flat bottom surfaces that may be placed flat on a ground or other working surface. Leg 106 may connect to bottom plate 104 at a distal end 162 of bottom plate, such that tapered portion 108 joins leg 106 to bottom plate 104. Further, terminal end 142 of leg 106 may be curved, in the embodiment shown in FIGS. 1 and 2, however, in alternative embodiments, terminal end 142 of leg 106 may square shaped, rectangular shaped, or any shape desired.

As shown in FIG. 1 and throughout the drawings, in one or more embodiments, bottom plate 104 is larger in size and diameter than top plate 101, which may preferably provide greater stability for bottom plate 104 to prevent any tipping or unevenness when bottom plate 104 and leg 106 are located flat against a flat surface. However, other sizes and diameters for bottom plate 104 are also possible in alternative configurations. More details regarding possible dimensions of top plate 101 and bottom plate 104 are provided below in the present description.

In one or more embodiments, leg 106 further includes hole 166. In one or more non-limiting embodiments, an aperture or hole 166 that may be used to hang leg 106 of holding device 100 on a peg or hook on a wall for easy storage purposes. Further, when storing holding device 100, a user may prefer to store holding device 100 in a compressed position. Accordingly, in one or more non-limiting embodiments, holding device 100 includes hole 164 as shown in FIGS. 1 and 2. To do keep top plate 101 flat against bottom plate 104 and to prevent top plate 101 from rotating upwards, a user may insert hook 114 through hole 164 of bottom plate 104 in order to keep the top plate 101 from angling upwards, and to provide for an easy storage option.

With respect to hinge assembly 116, hinge assembly 116 is used to affix top plate 102 to bottom plate 104 in a manner that utilizes a spring in order for top plate 102 to be able to angle upwardly "automatically" or through self-adjustment if a weight or other device is not holding top plate 102 down against bottom plate 104.

As shown in FIGS. 1 and 2, two torsion springs 124 are utilized. It is noted that in other embodiments, a greater or lesser number of springs may be used instead. As known in the art, torsion springs are helical springs made of stiff metal that are able to retain their shape and exert a rotary force or torque. In the shown embodiment, torsion springs 124 each have a coiled element 125 (i.e. helix), a top protruding member or leg 127, and a bottom protruding member or leg 128. Each torsion spring 124 is able to retain its original shape such that if there is a compressive force, the torsion springs 124 compress, but then expand back to their original shape and position. In the one or more embodiments shown in the attached Figures, attaching the ends (e.g. top protruding members 127 and bottom protruding members 128) to top plate 101 and bottom plate 104 (e.g. via channels 13) causes the torsion springs 124 to store mechanical energy when top plate 102 is compressed, and then force top plate 102 to angle upwardly with respect to bottom plate 104 (e.g. as shown in FIGS. 1, 2, 5, and 8) when the pushing force is removed. Thus, torsion springs 124 facilitate the angled position of top plate 101 with respect to bottom plate 104.

Various actions or forces may be used to hold down top plate 101. For example, when a container is located on top surface 102 of top plate 101, if the weight of the container is greater than a threshold pre-determined weight, then the top plate 101 will remain flat and compressed against bottom plate 104. However, if the weight of the container is less than a threshold pre-determine weight, then the top plate 101 will be able to spring upwardly.

As noted above, another way to keep top plate 101 from springing upwardly to its natural position (i.e. without an added pushing force) is to insert hook 114 in hole 164 of bottom plate 104, and thus holding device 100 may be stored in its compressed position or state.

To hold top plate 101 in an upwardly angled position, torsion springs 124 each include top protruding member or end 127 which when inserted and held in place is in contact with an underside surface of top plate 101. Top protruding member 127 for each torsion spring 124 is angled upwardly, which helps to cause top plate 101 to also angle upwardly. Further, torsion springs 124 each include bottom protruding member 128 which extends in an outwardly, straight manner from the helix 125 of each torsion spring 124. The bottom protruding member 128 for each torsion spring 124 is intended to be inserted and held laterally in place by the sides of channels 130. This may be better be seen in FIG. 3 which shows a close up view of hinge assembly 116, including a portion of bottom protruding member 128 for each torsion spring 124 when inserted into channels 130. In terms of application, in one or more embodiments, torsion springs 124 may be held radially in place by force and laterally in place by channels 130 when bottom protruding ends 128 are located in channels 130.

As shown in the expanded view of container holding device 100 in FIG. 2, hinge assembly 116 may also generally include center connecting element 117 and two side connecting elements 119. In one or more non-limiting embodiments, center connecting element 117 is attached centrally to a proximate edge of top plate 101, while the first side connecting element 119 and second side connecting elements 119 are connected to each side of a proximate end of bottom plate 104. Center connecting element 117 of top plate 101 is positioned to be fit in between the first and second side connecting elements 119 of bottom plate 104.

Center connecting element 117 includes a bore 118 that extends all the way through from one end of center connecting element 117 to the other end of center connecting element 117. Similarly, first side connecting element 119 and second side connecting element 119 each include a bore (i.e. bore 120) that extends through the body of these connecting elements 119.

Each connecting piece or element 117 and 119 includes a bore that extends through the pieces. Further, each helix or coiled element 125 of torsion springs 124 also includes its own centrally located bore 126 that extends through the coiled element 125. In order to connect all of the pieces of the hinge assembly together, which is further shown in close up view in FIG. 3, a pin, such as pin 121 is adapted to be inserted into each bore of each piece and then capped on either end using caps 123 to keep pin 121 securely in place.

Accordingly, as shown in FIG. 2 and also FIG. 3, a preferred order for assembling hinge assembly 116 may include inserting pin 121 through bore 120 of first side connecting element, through bore 126 of first torsion spring 124, through bore 118 of central connecting element, through bore 126 of second torsion spring 124, and then through bore 120 of second side connecting element. FIG. 3 shows a close up view of coiled elements 125 wrapped around pin 121 and held in a compressed position, which may occur when a pushing force (including a weight) is applied to top plate 101 to force top plate 101 down.

In one or more embodiments, pin 121 may include its own smaller opening 122 on each end so as to allow the tips of caps 123 to securely fit within each opening 122 of pin 121. Those of ordinary skill in the art will appreciate that there may be other ways and configurations to arrange hinge assembly 116, and all are within the scope of the present description.

The design of hinge assembly 116 of holding device 100 allows for top plate 101 to be pivotable or rotatable with respect to bottom plate 104 using the elastic properties of torsion springs 124. In other embodiments, holding device 100 may include a greater or lesser number of torsion springs than that shown in FIGS. 1-3.

In one or more embodiments, holding device 100 is configured to tilt top plate 101 to a pre-determined angle at which the top plate 101 stops moving upwardly. The pre-determined angle may be a maximum angle at which the top plate 101 stops tilting upwardly. In one non-limiting embodiment, this angle may be between a range of approximately 15 degrees to approximately 30 degrees. In one preferred embodiment, the pre-determined angle at which top plate 101 stops moving upwardly may be 20 degrees, although those of ordinary skill in the art will appreciate that other angles may be used and that it is not intended to limit the angle of tilt of top plate 101 to this particular number. In alternative embodiments, the pre-determined angle of holding device 101 may be adjustable by a user. Further, in other alternative embodiments, top plate 101 may tilt and stop over a range or a plurality of angles.

As noted above, various elements of holding device 100 may be made of any type of suitable material, including, but not limited to, plastic material. Such elements of holding device 100 may include top plate 101, bottom plate 104, leg 106, and connecting elements 117 and 119 of hinge assembly 116. Further, the plastic material may include, but is not limited to thermoplastics, thermosetting polymers, or additional rigid materials. Hook 114 may be made from any suitable material, including, but not limited to, metal, plastic, rubber, or a combination thereof. Further, bungee cord 110 may be made from any type of material that provides some level of elasticity in accordance with bungee cords that are made in the art.

In one or more embodiments, pin 121 and/or torsion springs 124 may be made of stainless steel, although any other type of material desired may be used in alternative configurations. Caps 123 may be made of plastic or metal or any other type of material without limitation. Further, holding device 100 may include one or more colors and/or logos or designs as desired.

Further, holding device 100 may be designed to accommodate any size or dimensions necessary. In one exemplary, non-limiting embodiment, holding device 101 may be formed and sized having the following dimensions: a diameter of top plate 101 may be approximately 10.30 inches and a diameter of bottom plate 101 may be approximately 12 inches. A width of leg 101 may be approximately 2 inches. Further, an overall length of holding device from hinge assembly 116 to the terminal end 142 of leg 106 may be approximately 20.27 inches. Additionally, a height of top plate 101 from the bottom to edge 136 of top plate may be approximately 0.61 inches, while an additional 0.25 inches is provided for a height from edge 136 to top of retaining wall 138.

Further, a maximum height from top surface 103 of bottom plate 104 to a bottom surface of leg 106 may be approximately 0.50 inches, with the maximum height being at the highest point of the tapered portion 108. After the tapered portion 108 tapers to its lowest point, a maximum height of leg 106 may be reduced to 0.31 inches. A height from a bottom side of leg 106 to end 136 of top plate 101 may be approximately 1 inch, with additional 0.25 inches from end 136 to a top of retaining wall 138. Those of ordinary skill in the art will appreciate that these dimensions are provided for one exemplary, non-limiting embodiment, and that these dimensions are not intended to be limiting to the size of any component of holding device 100. Alternative sized or designed holding devices 100 may have one or more dimensions that vary from those noted and described in this paragraph or elsewhere.

In one or more embodiments, holding device 100 may further include ribs that extend generally vertically and horizontally on an underside of top plate 101 and along an underside of bottom plate 104. FIG. 3 and FIG. 7 show examples of ribs includes on an underside of top plate 101. While a drawing is not shown of bottom plate 104 having ribs located on an underside of bottom plate 104, it is noted that in one or more embodiments, it may be useful to include various ribs similar to the arrangement and configuration shown in FIG. 3 and FIG. 7 on an underside of bottom plate 104.

FIG. 3 and FIG. 7 shows examples of generally vertical ribs, such as vertical rib 152, and generally horizontal ribs 150 that are located on an underside of top plate 101. Each rib (150 or 152) provides further strength and stability to holding device 100. As shown in FIG. 3, the ribs 150 may be more concentrated together particularly near hinge assembly 116 under top plate 101, and spaced apart in a wider fashion elsewhere. Also, as shown in FIG. 3, the ribs, symbolized by ribs 150 and 152, may generally follow the circular shape of top plate 101 or bottom plate 104 and may fan out in a circular fashion. These ribs as located under top plate 101 and bottom plate 104 may be made from plastic material as well, and may have any design or arrangement as desired.

Figure 5:
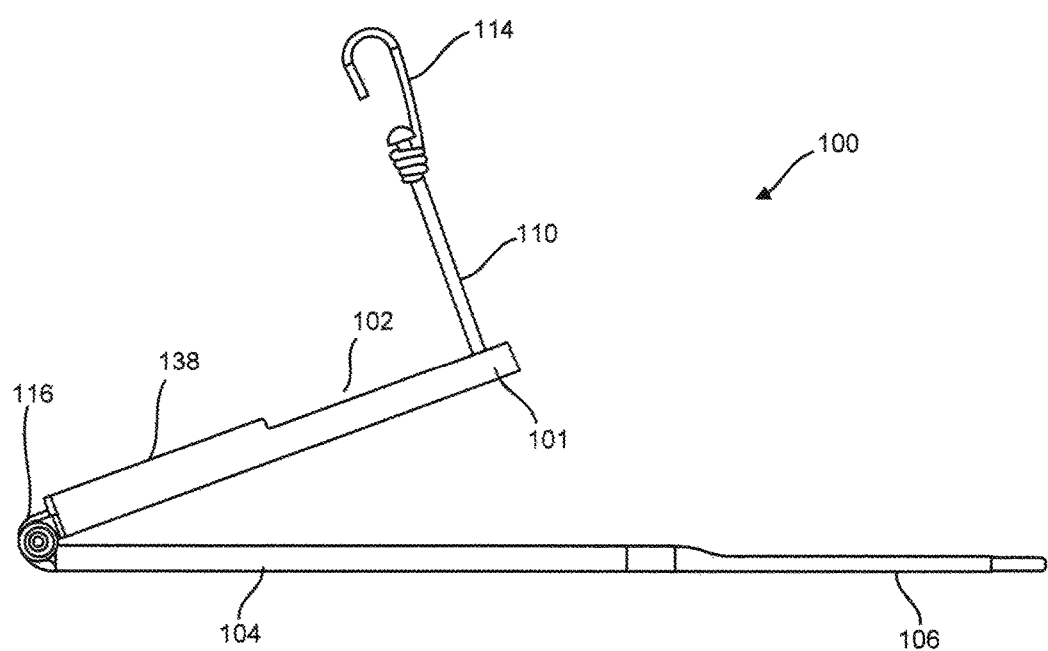
FIG. 5 is a side view of a container holding device in an expanded position in accordance with one or more illustrative embodiments.
Figure 6:
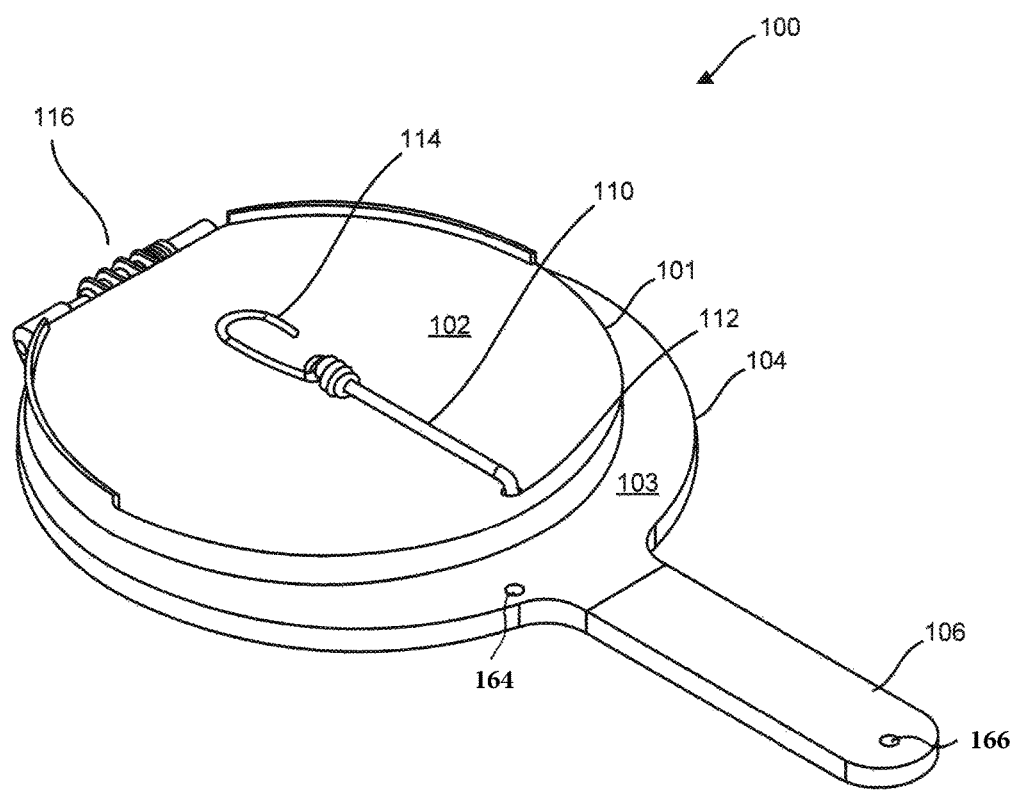
FIG. 6 is another perspective view of a container holding device in a compressed position.

Turning to FIGS. 4-6, FIG. 4 shows a side view of holding device 100 in a compressed position. In FIG. 4, top plate 101 is parallel and in contact with bottom plate 104. Conversely, FIG. 5 shows a side view of holding device 100 in an expanded position, whereby top plate 101 is angled upwardly away with respect to bottom plate 104. Accordingly, in FIG. 5, an underside of top plate 101 is not making contact with a top surface 103 (shown in FIG. 1) of bottom plate 104. Thus, because of the assembly and connection of pieces that make up hinge assembly 116, top plate 101 is moveable in an upward and downward direction at an angle with respect to bottom plate 104. As further explained later below with respect to FIGS. 8 and 9, this may be particularly useful when locating a container (e.g. container 802 in FIG. 8) on top of top plate 101.

FIG. 6 shows another side view of holding device 100 in a compressed position, because top plate 101 is generally located flat against bottom plate 104 and in contact with a top surface 103 of bottom plate 104. Hole 164, as shown in FIG. 6 and as previously mentioned, may be useful for receiving hook 114 so a user can store holding device 100 in a compressed position, which may save space and make it easier to store holding device 100 when not in use.

Turning to FIG. 8 and FIG. 9, FIG. 8 and FIG. 9 show how holding device 100 may be used in operation when combined with a container, as well as with a paint sprayer in one or more non-limiting embodiments. FIG. 8 shows an exemplary view of holding device 100 in operation. In FIG. 8, a container 802 is illustrated as a bucket in a non-limiting example of a container that may be positioned onto holding device 100.

Container 802 includes an open end and a closed end. At its open end is the container opening 806, which is useful for pouring liquids and positioning other items into container 802. At its closed end, the bottom surface 808 of container 802 is pressed flat against the top surface 102 of top plate 101. Container 802 may also preferably include a handle, such as handle 810. Handle 810 is rotatably coupled to container 802, such that handle 810 is rotatable in an upwards and downwards direction. In an upright direction, the handle is generally straight above container opening 806, and may be used by a user to conveniently carry and manipulate a position of container 802. In a downwards position, handle 810 is rotated generally in a downward direction as shown in FIG. 8.

In one or more non-limiting embodiments, container 802 is sized to hold anywhere from at least 1 gallon up to 5 or more gallons of material. However, those of ordinary skill in the art will appreciate that greater or lesser gallons of material may be used, and holding device 100 may be configured to accommodate these different sized containers. It is note that paint may also have different weight than other liquids and as such, the weight of the container may vary with different types of paints.

In one or more non-limiting embodiments, when holding device 100 is in operation, hook 114 is hooked over handle 810 to activate top plate 101's connection to container 802 as well as to hold container 802 in place. While FIG. 8 does not specifically illustrate as much, container 802 may also be retained in place by retaining wall 138 which may act as a barrier to prevent container 802 from slipping and falling off of a proximate end of holding device 100.

Accordingly, when using holding device 100, it may be useful to orient container 802 in a proper orientation. In a proper orientation, the side of container 802 having handle 810 is facing closest to a location of bungee cord 110 and hook 114, while the opposite side of container 802 is located near the proximate end of top plate 101, i.e. the end located nearest to hinge assembly 116. FIG. 8 further shows intake tubes 902 and 903 located within the opening 806 of container 802. Intake tubes 902 and 902 are intake tubes that come from paint sprayer 904, as further explained below with respect to FIG. 9.

Turning to FIG. 9, FIG. 9 shows a pictorial illustration of an exemplary system of components that may be used in conjunction with holding device 100. In one or more embodiments, this system shown in FIG. 9 may be implemented using a paint sprayer, such as paint sprayer 904 which has an attached paint spray gun 922 that is attached by a connecting cable 920. Paint sprayer 904 may be any type of paint sprayer known in the art, including, but not limited to airless or non-airless paint sprayers. Examples of well-known airless paint sprayers include (in a non-limiting example) TITAN 440 Airless Paint Sprayer. Paint sprayer 904 may be an upright standing model and also may be a floor based model that has a base to support itself independently on a floor or other surface as shown in FIG. 9. As noted above with respect to all of the drawings that accompany the present description, FIG. 9 is not to scale, and thus floor model 904 may be sized differently than what is shown in FIG. 9, as would container 802 and holding device 100.

As described above, paint sprayer 904 may be a motorized paint sprayer that pumps pressurized paint to paint spray gun 922. To access paint (including any type or kind of paint or coating), intake tubes 902 and 903 are put inside of the opening 806 of container 802. Intake tubes 902 and 903 connect to paint sprayer 904 and are adapted to intake the paint from container 802. Then, paint sprayer 904 routes the paint from intake tubes 902 and 903 to connecting cord 920 and to a nozzle or tip of paint spray gun 922. It is noted that paint spray gun 922 may be any type of suitable paint gun having any preferred tip or nozzle as known in the art without limitation herein.

It is intended that container 802 in FIG. 8 and FIG. 9 has a certain amount of material within container 802. In one non-limiting example, the material in container 802 is specifically paint material. As shown in FIG. 8, the amount of material contained within container 802 is less than a threshold amount or weight that would weigh top plate 101 down against bottom plate 104, and for this reason, top plate 101 is shown as angled upwardly and container 802 is effectively tilted.

On the other hand, FIG. 9 is intended to illustrate that the weight and amount of the material within container 802 is heavy enough to exceed a threshold amount or weight, such that the top plate 101 of holding device 100 is flat and in contact with a top surface (e.g. 103) of bottom plate 104. Additionally, hinge assembly 116 in FIG. 8 is shown in an open or expanded position, because the torsion springs 124 are expanded. In FIG. 9, hinge assembly 116 is shown in a closed or compressed position, because torsion springs 124 are compressed. Further, hook 114 is also hooked over handle 810 in FIGS. 8 and 9 and is operably engaged such that the orientation of container 802 is aligned with an orientation of a top plate 101 of holding device 100.

In FIG. 9, a painter or contractor may be able to position holding device 100 flat against a ground or other surface. Paint sprayer 904 may be activated, by being plugged into a nearby power outlet or other power source. It is understandable that paint sprayer 904 may include various on-off switches and various other switches to control various control settings on paint sprayer 904 other than what is shown in FIG. 9. Intake tubes 902 and 903 may be positioned within container opening 806 of container 802 as shown in FIG. 9. It may be preferably that a user fill container 802 prior to activating paint sprayer 904.

While not shown in FIG. 9, it may be preferable for at least one leg or other part of paint sprayer 904 to be positioned on top of leg 106 of holding device 100. By positioning paint sprayer 904 on top of leg 106 of holding device 100, the holding device 100 may be more stable and secure as located on a working surface and it may be less likely that container 802 tips or falls off of top plate 101.

Once container 802 is filled to a desired amount (e.g. 1 gallon, 2 gallon, 3, gallons, 4 gallons, 5 gallons without limitation thereto), paint sprayer 904 may be activated and intake tubes 902 and 903 may begin to intake paint from container 802. The paint that is drawn into intake tubes 902 and 903 may then be routed according to the control settings of paint sprayer 904 into connecting cable 920, and routed to paint spray gun 922.

When material in container 802 is less than a pre-determined amount (e.g. 0.5 gallons or half (½) a pound or any other pre-determined amount as desired without limitation herein), the top plate 101 of holding device 100 is adapted to tilt upwards as a result of the torsion springs 124 in hinge assembly 116 being inclined to return to their original, expanded position. Thus, the orientation of container 802 matches the orientation and tilt of top plate 101. Any material or paint remaining in container 802 is displaced to one side of container 802. It may be then easier for intake tubes 902 and 903 to draw in the remaining amount of paint located within container 802. Further, it may be a result of the displacement of material to one side of container 802 that intake tubes 902 and 903 are also automatically shifted to the side of the container having the displaced material (e.g. paint). As such, a painter, contractor, or other user is able to use a greater amount of material located within holding device 100 over a longer period of continuous painting time and the automatic, self-adjusting nature of holding device 100 saves the user a significant amount of time and effort. In other words, the holding device 100 acts as an aid to assist the user who is not required to continuously monitor a level of material within container 802 or to stop and prop up the container 802.

Turning to FIG. 10, FIG. 10 shows another embodiment of a holding device. Holding device 1000 may be a holding device that is in accordance with holding device 100 shown in FIG. 1 and described above with respect to FIGS. 1-9. Holding device 1000 is intended to be designed, operate, and function in every way the same as holding device 100, and includes the same essential components and elements as described above with holding device 100 (including a top plate, bottom plate, leg, retaining wall, and hinge assembly, and any other component of holding device 100). Thus, any of the steps for a method of using and operating holding device 100 may be applied to holding device 1000 in FIG. 10.

As shown in FIG. 10, hook 1014 is attached to bungee cord 1010, and is coupled to top plate 1001 of holding device 1000. In one or more non-limiting embodiments, bungee cord 1010 is inserted through hole 1012, and hook 1014 is attached to an upper end of bungee cord 1010. It is noted that top plate 1001 is in accordance with top plate 101, hook 1014 is in accordance with hook 114, bungee cord 1010 is in accordance with bungee cord 110, and hole 1012 is in accordance with hole 112 of holding device 100. Further, in one or more non-limiting embodiments, a knot, similar to knot 144, may be tied at a lower end of bungee cord 1010 (not shown in FIG. 10) under top plate 1001 to hold bungee cord 1010 in place. Other means may also be used to fasten hook 1014 and bungee cord 1010 in place on top plate 1001.

Notably, in FIG. 10, holding device 1000 includes top plate 1001 which is generally circular in shape but also includes a curved protruding portion 1036 that extends beyond an end of top plate 101. Thus, top plate 1001 is suited to accommodate the general circular shapes of containers used to hold material in the paint or other labor industry (e.g. container 802).

Curved protruding portion 1036 is located at a distal end of holding device 1000 (whereby the distal end is located opposite from the hinge assembly). Further, hole 1012 passes through curved protruding portion 1036, and as such bungee cord 1010 and hook 1014 extend upwardly from curved protruding portion 1036. In some embodiments, it may be preferable for the shape and design of top plate 1001 to be used because a container (e.g. container 802) is able to be positioned on top of top plate 101 without any interference of an edge of container 802 with a position of hook 1014 and bungee cord 1010. As stated above, it is foreseeable that holding device 101 may be modified to include a curved protruding portion, such as curved protruding portion 1036 shown in FIG. 10 so as to accommodate containers and to avoid any possibility of the containers blocking or extending over the location of a bungee cord and hook (e.g. bungee cord 110 and hook 114). Nevertheless, top plate 101 and top plate 1001 may be formed to have various shapes and designs other than those shown in the attached drawings.

Figure 11:
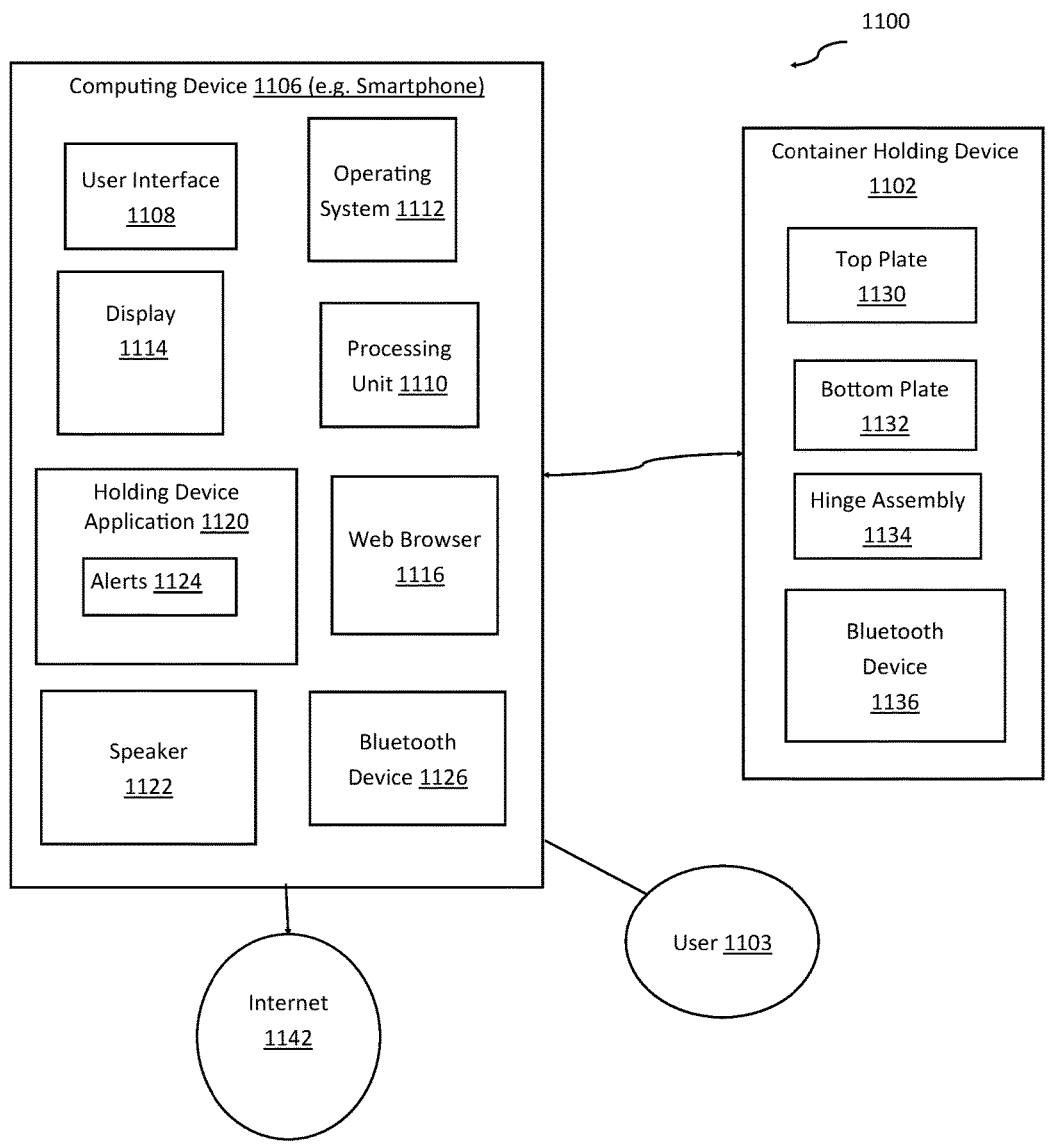
FIG. 11 is a block diagram of a computing device paired with a container holding device that is Bluetooth enabled in accordance with one or more illustrative embodiments.

FIG. 11 shows a block diagram for a computing device paired with a container holding device in accordance with one or more illustrative embodiments. In one or more embodiments, system 1100 includes computing device 1106 and container holding device 1102. Container holding device 1102 may be a container holding device in accordance with container holding device 100 and 1000 as described above in the present description. Accordingly, top plate 1130 of container holding device 1102 may function and be designed in accordance with top plate 101 and top plate 1001. Further, bottom plate 1132 may function and be designed in accordance with bottom plate 104, while hinge assembly 1134 may be in accordance with hinge assembly 116. Additional components such as leg 106, hook 114 and bungee cord 110, and ribs 150 and 152 may all be included as well with container holding device 1102, as well as any other components of holding device 100 or 1000.

Notably, FIG. 11 illustrates that container holding device 1102 may be Bluetooth enabled, and thus may be configured to include a Bluetooth component, such as Bluetooth device 1136. As known in the art, Bluetooth is a wireless technology protocol for exchanging data over shorter distances using short-wavelength radio waves from fixed and mobile devices. Accordingly, Bluetooth device 1136 may be coupled to container holding device 1102 in order to beneficially notify user 1103 (e.g. via smartphone 1106 or other computing device associated with user 1103) when a top plate, such as top plate 1130 container holding device 1102 is tilted upwards.

Bluetooth device 1136 may be adapted to pair with other Bluetooth devices (e.g. computing device 1106) so that the two devices can communicate over Bluetooth protocol. Bluetooth device 1136 and Bluetooth device 1126 may be any type of Bluetooth enabling device including, any type of Bluetooth transceiver and/or a single chip. A transceiver as known in the art is able to transmit and receive various signals, accordingly if Bluetooth device 1136 is a transceiver, it is able to transmit and receive signals as well.

In one or more embodiments, Bluetooth device 1136 may be attached to, embedded in, or otherwise affixed to top plate 1130, including, but not limited to, being attached to an underside of top plate 1130. Alternatively, Bluetooth device 1136 may be attached to, embedded in, or otherwise affixed to any other part of container holding device 1102.

Computing device 1106 may be any type of computing device known in the art. In one preferred embodiment, computing device 1106 is a smartphone that belongs to or is otherwise associated with user 1103, although other computing devices may also be used, including tablets or wearable technology, such as wearable smartwatches. Further, any type of smartphone known the industry may be used (e.g. iPhone™, Galaxy™, as well as smartphones associated with LG to name a few non-limiting examples.). Smartphones are well-known for containing significant computing power that is capable of presenting audio-visual content and able to gather, analyze, transform, and present information.

In accordance with a variety of existing smart devices, computing device 1106 may include many components including a user interface, such as user interface 1108, which may be a keyboard, including a touch screen based keyboard. Further, computing device 1106 may include an operating system such as operating system 1112. Operating system 1112 may be adapted to operate one or more systems, modules, or components located on computing device 1106. Operating system 1112 may be a mobile type of operating system and may be configured particularly for smartphones, tablets, or other mobile wearable devices. Further, computing device 1106 may include one or more processing units, such as processing unit 1110 to control and process information on computing device 1106.

Display 1114 may be a display device adapted for user 1103 to interact with and adapted for displaying information to user 1103, including images or text. Display 1114 may be any type of display device known in the art, including, without limitation, a screen capable of generating an image or text, such as a touch screen, mobile phone display screen, or any other type of display device known in the art.

Web browser 1116 may be any type of web browser used to surf and access the Internet 1142 (or other networks). Further, computing device 1106 may include one or more speakers, such as speaker 1122. Those of ordinary skill in the art will appreciate that computing device 1106 may include many other components and provide numerous functions not included herein or shown in FIG. 11. However, for purposes of simplification and avoiding unnecessary details that are known to those skilled in the industry, these details have been omitted.

Notably, computing device 1106 may be Bluetooth enabled and may include one or more Bluetooth enabling components, such as Bluetooth device 1126. Bluetooth device 1126 may include, but is not limited, to any type of Bluetooth transceiver used in the industry or other Bluetooth enabling technology.

It may be advantageous to have the ability to notify user 1103 of the movement of a top plate 1130 of container holding device 1102, because it is expected that user 1103 will usually have his or her smartphone or other similar computing device with him or her. These devices are easily located in one's pocket or placed nearby even as one is working on a project (e.g. painting site or other location).

Accordingly, in one or more embodiments, a software module such as holding device application 1120 may be a module or phone application used to process and communicate alerts 1124 to notify user 1103 when top plate 1130 of container holding device 1102 has tilted in an upward direction. This may be particularly useful to a painter or contractor who is located some distance away from his or her smartphone 1106 and is unable to easily discover if the contents in a container located on container holding device 1102 (e.g. container 802) has been reduced enough to cause holding device 1102 to raise up. Holding device application 1120 may be downloaded onto a user's smartphone 1106 (or other computing device) using the Internet 1142 or other type of network, and may be regularly updated. Further, holding device application 1120 may be configured by user 1103 to determine when a container, such as container 802, is initially placed on top plate 1130 at its heaviest weight such that top plate 1130 is in a compressed position (i.e. not tilted upwards at an angle away from bottom plate 1132).

Alerts 1124 may be adapted as desired to accommodate user 1103. In one or more non-limiting embodiments, alerts 1124 may be audio and/or visual alerts that are provided using one or more components of computing device 1106, such as display 1114 (e.g. a touchscreen) and/or speaker 1122. In one preferred embodiment, computing device 1106 may be configured to vibrate when container holding device 1102 raises up, thereby notifying or alerting user 1103 through the vibrating movement and sound associated with computing device 1106 that top plate 1130, and by extension, the container located on container holding device 1102 have tilted upwards. In addition to the actual vibration of computing device 1106, additional auditory and/or visual alerts 1124 may also be set up.

Thus, system 1100 provides the advantage of notifying using Bluetooth a user, such as user 1103, when the contents of a container located on container holding device 1102 may be reduced to a pre-determined amount (e.g. 0.5 gallons or any other amount without limitation thereto), thus causing the holding device 1102 to self-adjust and tilt upwardly. This notification system may also notify the painter and/or contractor to anticipate refilling the contents of the container with additional material if necessary.

Turning to FIG. 12, FIG. 12 is a flowchart of an exemplary process for using and operating a container holding device according to one or more non-limiting embodiments. At step 1202, the process may begin by providing a container holding device that may be self-adjusting and automatically tilt upwards when not compressed via a pushing or restraining force. In one or more non-limiting embodiments, the container holding device may be in accordance with container holding device 101, 1000, or 1102 as described above. Accordingly, container holding device may include top plate 101 or 1001, bottom plate 104, hinge assembly 116, leg 106, retaining wall 138, in addition to various other components described above.

At step 1204, the container holding device is placed on an intended surface, such as a working surface, floor, ground surface, or any other type of surface. At step 1206, a container is provided. In one or more non-limiting embodiments, the container may include a handle and an open end for locating material and other items within the container. Container may be in accordance with container 802. However, it is noted that in alternative embodiments, the provided container does not necessarily need to include a handle. It may still be possible for container to be retained against a retaining wall, such as retaining wall 138, without falling off or sliding off a top surface of the container holding device.

At step 1208, the container is placed on a top surface of the top plate of the container holding device. As noted in step 1210, if the container is heavier than a pre-determined weight for top plate 101 to remain tilted in its expanded position, then the top plate of the container holding device is pushed down by the weight of the container and positioned flat against the bottom plate, such that top plate is in a compressed position. This may be due to the torsion springs (e.g. torsion springs 124) located in a hinge assembly (e.g. hinge assembly 116) of the container holding device also being in a compressed position.

At step 1212, if the container includes a handle, the container may be oriented such that the handle is facing the bungee cord and hook assembly, and the hook is located over the handle to position in place. At step 1214, an amount of material may be reduced from the container. As noted with respect to FIG. 8 and FIG. 9, this may include using a paint sprayer and intake tubes to reduce the material from the container, although other methods and systems may be used to reduce the material in the container as well.

At step 1216, if a sufficient amount of material has been reduced from container such that the weight of the container is less than the pre-determined threshold weight needed to keep top plate pressed against the bottom plate, then the top plate of the container holding device rotates in an upward direction away from the bottom plate. In particular, in one or more embodiments, top plate is angled upwardly away from bottom plate and may stop at a maximum stopping point. Accordingly, at step 1218, the material located in the container is displaced to one side of the container and the container is oriented in a tilted position, because the top plate of the container holding device is tilted. In this manner, the container holding device offers numerous mechanical advantages for conveniently tilting a container and displacing the material located therein to one side.

While the present description has included many specific details with respect to paint sprayers and a method of using containers for painting, those of ordinary skill in the art can appreciate that this system may be used for numerous other applications other than painting. It is foreseeable that the apparatus and method, according to one or more embodiments, described in the present description may be beneficial and helpful when applying any type of material from a container (including non-paint material) to a surface using a motorized device having an intake system, such as one or more intake tubes that may be located within the container.

While this invention has been described in conjunction with the specific embodiments outlined above, it is evident that many alternatives, modifications and variations will be apparent to those skilled in the art. Accordingly, the preferred embodiments of the invention, as set forth above, are intended to be illustrative, not limiting. Various changes may be made without departing from the spirit and scope of this invention.

What is claimed is:

1. An apparatus, comprising:
   a top plate, the top plate having a proximate end and a distal end;
   a hinge assembly, wherein the proximate end of the top plate is located proximate to the hinge assembly and the distal end of the top plate is located on an opposite end from the proximate end;
   a bottom plate, wherein the top plate is hingedly coupled to the bottom plate by the hinge assembly, the bottom plate having a proximate end and a distal end, wherein the proximate end of the bottom plate is located proximate to the hinge assembly and the distal end of the bottom plate is located on an opposite end from the proximate end;
a leg extending outwardly away from the bottom plate, wherein the leg is coplanar with the bottom plate, and wherein the leg is connected to the bottom plate near the distal end of the bottom plate;
a hook connected to a top end of a bungee cord, wherein the bungee cord is adapted to extend upwardly from a top surface of the top plate; and
a retaining wall, wherein the retaining wall protrudes upwardly from the top surface of the top plate, and wherein the retaining wall extends around at least a portion of a perimeter of the top plate,
wherein the top plate is rotatable relative to the bottom plate,
and wherein the apparatus is adapted to hold a container, the container being positionable on the top surface of the top plate and at least partially enclosed by the retaining wall.

2. The apparatus of claim 1, wherein the hinge assembly further comprises a first side connecting element, a first torsion spring, a central connecting element, a second torsion spring, and a second side connecting element.

3. The apparatus of claim 2, wherein the hinge assembly further comprises:
the central connecting element attached to the proximate end of the top plate in a substantially central position, wherein the central connecting element includes a bore that extends longitudinally through a body of the central connecting element; and
the first side connecting element and the second side connecting element attached to each side of the proximate end of the bottom plate, wherein the first side connecting element and the second side connecting element each include a bore that extends through a body, respectively, of the first side connecting element and through the second side connecting element.

4. The apparatus of claim 2, wherein the first torsion spring is configured to be located between the first side connecting element and the central connecting element, and wherein the second torsion spring is configured to be located between the second side connecting element and the central connecting element.

5. The apparatus of claim 2, wherein the first torsion spring and the second torsion spring each, respectively, include a bore extending therethrough.

6. The apparatus of claim 2, further comprising a pin, wherein the pin is adapted to be inserted through each bore of the first connecting element, the first torsion spring, the central connecting element, and the second torsion spring, such that the top plate and the bottom plate are coupled to each other when the pin is inserted therethrough.

7. The apparatus of claim 2, wherein the first torsion spring and the second torsion spring each include a coiled element, a top protruding member that angles upwardly away from the coiled element, and a protruding member that extends outwardly in a substantially straight direction away from the coiled element.

8. The apparatus of claim 1, wherein the bottom plate further comprises:
a first channel formed in a top surface of the bottom plate near the proximate end of the bottom plate; and
a second channel formed in the top surface of the bottom plate near the proximate end of the bottom plate, wherein the first channel and the second channel extend in a longitudinal direction through a portion of the bottom plate near the proximate end of the bottom plate, wherein the first channel and the second channel are substantially parallel to each other.

9. The apparatus of claim 8, wherein the hinge assembly further comprises:
a first torsion spring and a second torsion spring each having a coiled element, a top protruding member that angles upwardly away from a top of the coiled element, a bottom protruding member that extends substantially in a straight direction away from a bottom of the coiled element,
wherein the top protruding member of the first torsion spring and the top protruding member of the second torsion spring are adapted to be held against a bottom surface of the top plate,
and wherein the bottom protruding member of the first torsion spring is adapted to be held in place in the first channel, and
wherein the bottom protruding member of the second torsion spring is adapted to be held in place in the second channel.

10. The apparatus of claim 1, wherein the container is either a bucket or a pail.

11. The apparatus of claim 1, wherein the top plate includes a curved protruding portion and the hook and bungee cord extend upwardly from the curved protruding portion.

12. A system comprising:
a container, wherein the container is configured to hold paint;
a device adapted for holding the container on a top surface of the device, the device further comprising:
a top plate;
a hinge assembly;
a bottom plate, wherein the bottom plate is hingedly coupled to the top plate by the hinge assembly;
a leg extending outwardly from the bottom plate, wherein the bottom plate is coplanar with the leg;
a hook connected to a bungee cord, wherein the hook connected to the bungee cord extends upwardly from a top surface of the top plate and is coupled to the top plate,
wherein the hinge assembly further comprises at least one torsion spring coupled to the bottom plate and the top plate as part of the hinge assembly such that the top plate is rotatable with respect to the bottom plate; and
a retaining wall protruding from the top surface of the device, wherein the retaining wall extends around at least a portion of a perimeter of the top plate,
wherein the container is configured to be held in place against the retaining wall of the device.

13. The system of claim 12, further comprising:
a paint sprayer having at least one intake tube, wherein the at least one intake tube is configured to be positioned in the container in order to intake paint located within the container into the at least one intake tube and to direct the paint to a paint spray gun connected to the paint sprayer.

14. The system of claim 12, wherein the container further includes a handle, and the hook is located over the handle.

15. The system of claim 13, wherein when a weight of the paint in the container is reduced to a pre-determined amount, the top plate of the device rotates upwardly to a pre-determined angle causing the paint in the container to displace to one side of the container, wherein the material is accessible to the at least one intake tube even at the reduced pre-determined amount.

16. A method of accessing material in a container using a device that holds the container, the method comprising:
providing the device comprising a top plate, a hinge assembly, a bottom plate, wherein the bottom plate is hingedly coupled to the top plate by the hinge assembly, the bottom plate having a leg extending outwardly from the bottom plate, wherein the bottom plate is coplanar with the leg, and a hook connected to a bungee cord, wherein the hook connected to the bungee cord extends upwardly from a top surface of the top plate, the hinge assembly further comprising at least one torsion spring coupled to the bottom plate and the top plate as part of the hinge assembly;
placing the device on an intended surface;
providing a container having a handle, wherein the handle is rotatable in an upwards and downwards direction;
placing the container on a top surface of the top plate, wherein a weight of the container causes the top plate to be flat and substantially parallel with the bottom plate;
orienting the container wherein a handle on the container is next to a position of the hook and the bungee cord, wherein the handle is oriented in a downward facing position;
responsive to placing the container on the top surface of the top plate, hooking the hook over the handle;
reducing an amount of material located within the container to a pre-determined weight, wherein the reduction in an amount of material in the container causes the top plate to automatically rotate upwardly at an angle away from the bottom plate;
responsive to rotating the top plate upwardly at an angle away from the bottom plate, displacing the material in the container to one side of an interior of the container as a result, wherein the container is tilted as located on the device.

17. The method of claim 16, wherein reducing an amount of the material in the container to a pre-determined weight, further comprises:
positioning at least one intake tube connected to a paint sprayer in the container; and
activating the paint sprayer to intake the material from the container into the at least one intake tube of the paint sprayer.

18. The method of claim 17, further comprising, positioning at least a portion of the paint sprayer on the leg of the device to provide stability for the device and the container.

19. The method of claim 16, further comprising, providing an audible and/or visual alert to a computing device associated with a user to notify the user when the top plate rotates upwardly an angle away from the bottom plate.

20. The method of claim 16, wherein when the container is filled with material having the weight greater than the pre-determined weight, the top plate is flat and parallel with the bottom plate and the at least one torsion spring is substantially compressed.

* * * * *